(12) United States Patent
Li

(10) Patent No.: US 9,134,477 B2
(45) Date of Patent: Sep. 15, 2015

(54) BACKLIGHT MODULE AND LED PACKAGING HAVING FIXED STRUCTURE

(76) Inventor: Quan Li, Shenzhen (CN)

(*) Notice: Subject to any disclaimer, the term of this patent is extended or adjusted under 35 U.S.C. 154(b) by 422 days.

(21) Appl. No.: 13/636,697

(22) PCT Filed: Jul. 13, 2012

(86) PCT No.: PCT/CN2012/078647
§ 371 (c)(1),
(2), (4) Date: Sep. 24, 2012

(87) PCT Pub. No.: WO2014/005351
PCT Pub. Date: Jan. 9, 2014

(65) Prior Publication Data
US 2014/0003030 A1 Jan. 2, 2014

(51) Int. Cl.
*F21V 8/00* (2006.01)
*F21V 19/00* (2006.01)
*F21Y 101/02* (2006.01)

(52) U.S. Cl.
CPC ............ *G02B 6/009* (2013.01); *F21V 19/0015* (2013.01); *F21V 19/0025* (2013.01); *G02B 6/0083* (2013.01); *G02B 6/0085* (2013.01); *G02B 6/0091* (2013.01); *F21Y 2101/02* (2013.01); *G02B 6/0075* (2013.01)

(58) Field of Classification Search
USPC ............ 439/56, 682, 857; 362/652, 656–659, 362/631, 612–613
See application file for complete search history.

(56) References Cited

U.S. PATENT DOCUMENTS

| 7,806,561 | B2* | 10/2010 | Chen ............................ 362/265 |
| 7,942,539 | B2* | 5/2011 | Kurokawa ...................... 362/26 |
| 8,388,212 | B2* | 3/2013 | Baek et al. .................... 362/634 |
| 8,672,529 | B2* | 3/2014 | Choi et al. .................... 362/612 |
| 2010/0124042 | A1 | 5/2010 | Cho et al. |

FOREIGN PATENT DOCUMENTS

| CN | 1609669 A | 4/2005 |
| CN | 101017278 A | 8/2007 |
| CN | 201306615 Y | 9/2009 |
| CN | 201615446 U | 10/2010 |
| CN | 101886791 A | 11/2010 |
| CN | 201621633 U | 11/2010 |
| CN | 101922648 A | 12/2010 |
| CN | 202056695 U | 11/2011 |
| CN | 102315363 A | 1/2012 |
| CN | 202103046 U | 1/2012 |
| JP | 2011-23295 A | 2/2011 |
| JP | 2011-134920 A | 7/2011 |

OTHER PUBLICATIONS

Dai Yunli, the International Searching Authority written comments, Apr. 2013, CN.

* cited by examiner

*Primary Examiner* — Robert May

(57) ABSTRACT

A backlight module includes a printed circuit board (PCB), and a light emitting diode (LEDs) arranged on the PCB. The PCB is configured with a fixing structure(s) for fixing the LED. The LEDs are configured with butting structures for butting with the fixing structures. The LEDs are mechanically fixed to the fixing structures of the PCB by the butting structures of the LEDs. The LEDs fixed by the fixing structures and the butting structures are removably connected, which facilitates replacement of the LEDs.

12 Claims, 4 Drawing Sheets

BACKLIGHT MODULE AND LED PACKAGING HAVING FIXED STRUCTURE

TECHNICAL FIELD

The present disclosure relates to the field of liquid crystal displays (LCDs), and more particularly to a backlight module, and a light emitting diode (LED) packaging structure.

BACKGROUND

As a key component of an LCD panel, a backlight module is mainly used for providing sufficient brightness and uniformly distributed light sources, to enable the LCD panel to display images. One or more LEDs are usually used as a light source of the backlight module. Optionally, a cold-cathode tube or other related structures can also be used as the light source of the backlight module. However, LEDs are widely used in typical LCDs because of the advantages of low energy consumption, long service life of LEDs.

In an LED backlight module, one lightbar is generally formed by soldering LED element(s) as light emitting unit(s) on a printed circuit board (PCB) by surface mount technology (SMT). If one of the LEDs is damaged or the chromaticity is not good (NG), the entire lightbar is required to be reworked in the PCI factory or scrapped. Additionally, because the damaged LED may not be able to be replaced in time, efficiency is reduced, and the reworking or scrapping and assembling directly affects manufacturing cost of LCDs.

SUMMARY

In view of the above-described problems, the aim of the present disclosure is to provide a backlight module and an LED packaging structure with low cost and convenient maintenance.

The aim of the present disclosure is achieved by the following technical scheme.

A backlight module comprises a backplane, a PCB arranged on the backplane, and LEDs arranged on the PCB. The backplane comprises a side wall(s) and a bottom plate. The PCB is positioned on the bottom plate. The LEDs are vertically arranged at an edge of the PCB, and an back of each LED is arranged close to the side will of the backplane. The PCB is configured with a first fixing structure on which a clamping slot is formed. Both two sides of a light emitting surface of the LED are configured with a second fixing structure on which a clamping strip is formed. The clamping strips on the two sides of the LED are respectively matched with and mechanically fixed to the clamping slot. An inner wall of the clamping slot is configured with convex structures. And a back surface and a bottom surface of the LED are configured with heat sinks.

The aim of the present disclosure can also be achieved by the following technical scheme. A backlight module comprises a PCB, and LEDs arranged on the PCB. The PCB is configured with a fixing structure(s) for fixing the LEDs. Each LED is configured with a butting structure used for butting with the fixing structure. The LED is mechanically fixed to the fixing structure of the PCB by the butting structure of the LED.

Preferably, the LED(s) is vertically arranged on the PCB. By vertically arranging the LED on the PCB, the light emitting surface of the LED is perpendicular to a surface of the PCB, and the PCB is positioned on a bottom plate of the backplane instead of being arranged on the side wall of the backplane, thereby increasing strength of the backplane without arranging holes for fixing the PCB in the side wall of the backplane.

Preferably, the backlight module comprises a backplane. The backplane comprises a side wall(s) and a bottom plate. The PCB is positioned on the bottom plate, the LEDs are vertically arranged at the edge of the PCB, and the back surfaces of the LEDs are arranged close to the side wall of the backplane. For an A value of an LCD module (distance from the light emitting surface of each LED to the edge of an active area of the LCD module), an thickness of the PCB can be increased and the optical quality can be improved by positioning the PCB on the bottom plate of the backplane and arranging the LEDs close to the side wall of the backplane. In addition, such arrangement enables the LEDs to be directly in contact with the side wall of the backplane, thereby favoring heat dissipation.

In one example, the fixing structure is a first fixing structure arranged on the PCB, and the first fixing structure is formed with a clamping slot. The butting structures of the second fixing structures arranged on the two opposite sides of each LED, and each of the second fixing structure is formed with a clamping strip. And the clamping strips of the two opposite sides of the LED are respectively matched with and fixed to the clamping slot. The LEDs can be directly and mechanically fixed to the PCB by matching the clamping slot with the clamping strips without any auxiliary tools. This is a convenient and quick mode.

Preferably, the clamping slot comprises two vertical supports which are oppositely arranged, and a connecting structure for connecting the bottom ends of the two vertical supports. The clamping slot is fixed to the PCB by the connecting structure. The clamping slot has the advantages of simple structure and convenient manufacture.

Preferably, the inner wall of the clamping slot is configured with convex structures. A clamping force of the clamping slot to the clamping strips of the LEDs is increased by the convex structures arranged on the inner wall. Thus, mounting reliability of LEDs is improved.

Preferably, the fixing structure is the clamping strip arranged on the PCB, and the butting structure is the clamping slot which is matched with the clamping strip and arranged on the LED. Optionally, the clamping slot can be arranged on the LED. Correspondingly, the clamping strip also can be arranged on the PCB.

Preferably, the back surface of the LED is configured with heat sinks. Relatively to the typical arrangement of arranging the heat sinks on the back surface of a lightbar (namely, the back surface of the PCB), by directly arranging the heat sinks on the back surface of the LED, the LED can directly dissipate heat through the heat sinks without conducting heat through the PCB. Thus, the efficiency of dissipating heat is enhanced.

Preferably, the bottom of the LED contacted with the PCB also is configured with heat sinks. Thus, the efficiency of dissipating heat is further enhanced.

An LED packaging structure comprises the fixing structures arranged on the PCB, and the butting structures arranged on the LEDs. And the LED is mechanically fixed to the fixing structure of the PCB by the butting structure of the LED.

In the present disclosure, because the fixing structure and the butting structure are respectively arranged on the PCB and the LED, the LEDs can be directly arranged on the PCB without SMT soldering. When the LEDs are packaged, only the LEDs are mechanically fixed to the PCB. Meanwhile, the LEDs minimally fixed by the fixing structures and the butting structures are removably connected, which facilitates the replacement of the LEDs. When the LED is damaged or chromaticity has certain distortion, only the damaged LED is removed and good LED(s) is mounted, without returning the entire lightbar to a factory for maintaining or scraping the entire lightbar.

DETAILED DESCRIPTION

Figure 1:
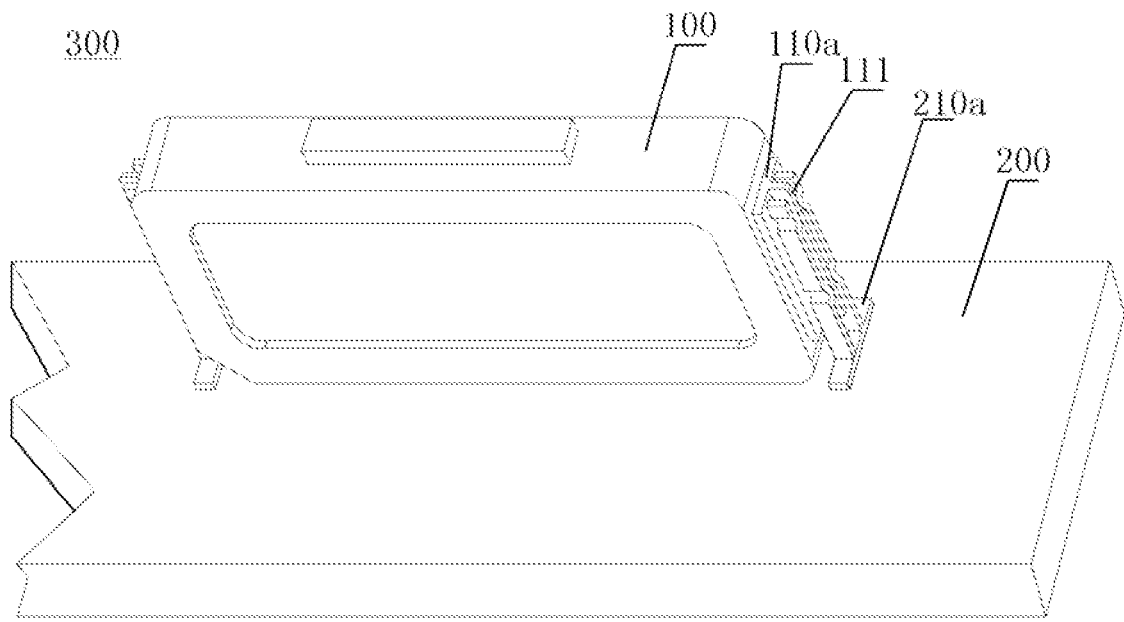
FIG. 1 is a simplified diagram of an LED packaging structure of a first example of the present disclosure.
Figure 6:
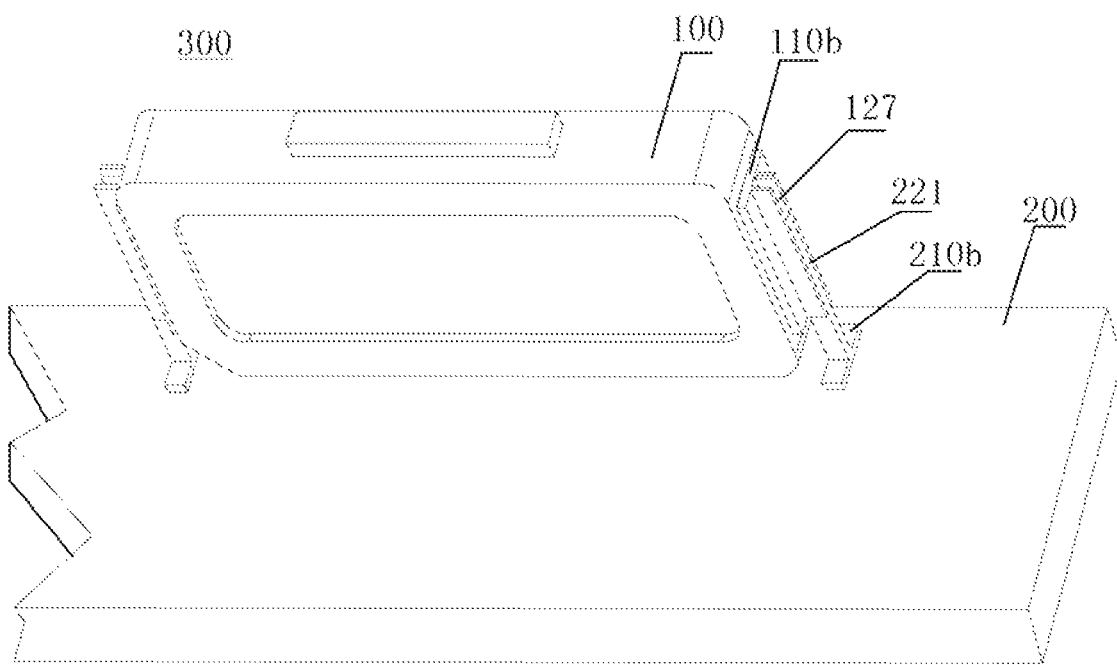
FIG. 6 is a simplified structure diagram of an LED packaging structure of a second example of the present disclosure.

FIG. 1 and FIG. 6 show an LED packaging structure of the present disclosure. The LED packaging structure comprises a fixing structure(s) 210 (the first fixing structure 210a or the third structure 210b) arranged on a PCB 200 and butting structures 110 (the second fixing structure or the fourth fixing structure) arranged on LEDs 100. Each LED 100 is mechanically fixed to the fixing structure on the PCB 200 by the butting structures.

The present disclosure will be further described in accordance with the Figures and preferred examples.

Example 1

Figure 2:
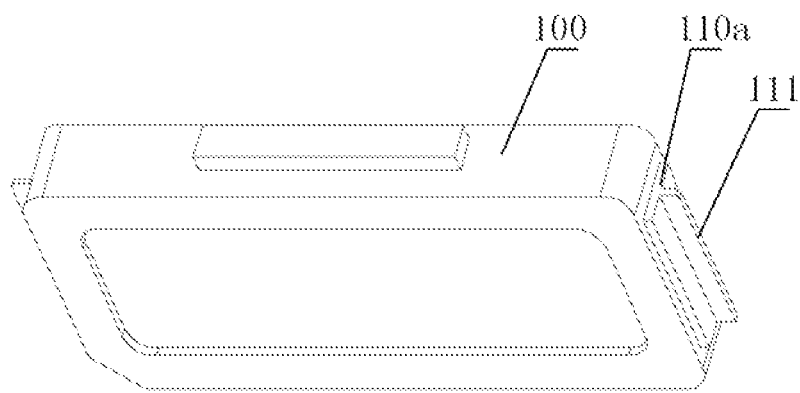
FIG. 2 is a simplified structure diagram of an LED of a first example of the present disclosure.
Figure 3:
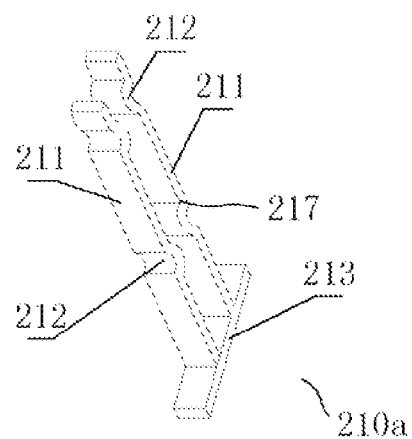
FIG. 3 is a simplified structure diagram of a first fixing structure on a PCB of a first example of the present disclosure.

FIG. 1 shows one example of a packaging structure of LEDs 100 on a lightbar 300 of the present disclosure. The packaging structure comprises a first fixing structure 210a arranged on a PCB 200 and the second fixing structure 110a arranged on the LEDs 100. The LED is of a block structure and is vertically arranged on the PCB 200. As shown in FIG. 2, protruding clamping strips 111 are formed on the second fixing structures 110a and the second fixing structures 110a are positioned on the two opposite sides of the LED 100. As shown in FIG. 3, the first fixing structure 210a comprises two vertical supports 211 which are oppositely arranged, and a connecting structure 213 that connects the two vertical supports 211. A clamping slot 217 that is used for clamping the clamping strips 111 is formed between the two vertical supports 211. Thus, when the LED 100 is packaged in the PCB 200, only the clamping strips 111 on the two sides of the LED 100 are directly inserted in the first fixing structures 210a of the PCB 200. Installation process is simple and does not use any complicated soldering process.

As shown in FIG. 3, the vertical supports 211 of the first fixing structure 210a are configured with convex structures 212, an inner protruding structure is formed on an inner wall of the clamping slot 217 by the convex structures 212. When the clamping strips 111 are inserted in the clamping slot 217, the clamping strips 111 are extruded by the convex structures 212 of the vertical supports 211, and a clamping force of the clamping slot 217 to the clamping strips 111 of the LED 100 is increased. Thus, mounting reliability of the LED 100 is improved. Optionally, because the first fixing structure 210a has certain elastic properties, the clamping strips 111 can be inserted in the clamping slots 217 and clamped by the two vertical supports 211.

Figure 4:
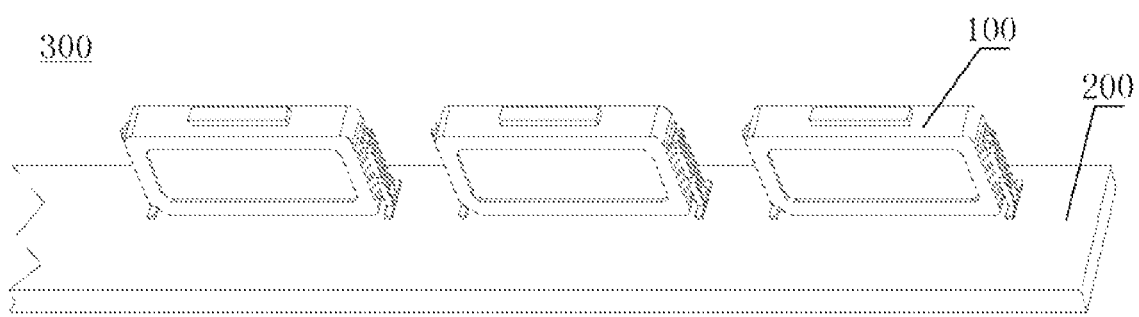
FIG. 4 is a simplified structure diagram of a lightbar of a first example of the present disclosure.

As shown in FIG. 4, all the LEDs 100 on the lightbar 300 are fixed to the first fixing structure 210a of the PCB 200 by the fixing structures arranged on the two sides of each LED 100. Thus, when any one of the LEDs 100 on the lightbar 300 is damaged or chromaticity is not good (NG), the LED 100 which is damaged or has NG chromaticity can be directly removed without returning the lightbar 300 to a factory for maintaining or scraping the lightbar 300.

In addition, the first fixing structures 210a and the clamping strips 111 are components for connecting the LEDs 100 with the PCB 200. Thus, the LEDs 100 can be electrically connected with the PCB 200 by contact between the first fixing structures 210a and the clamping strips 111.

Figure 7:
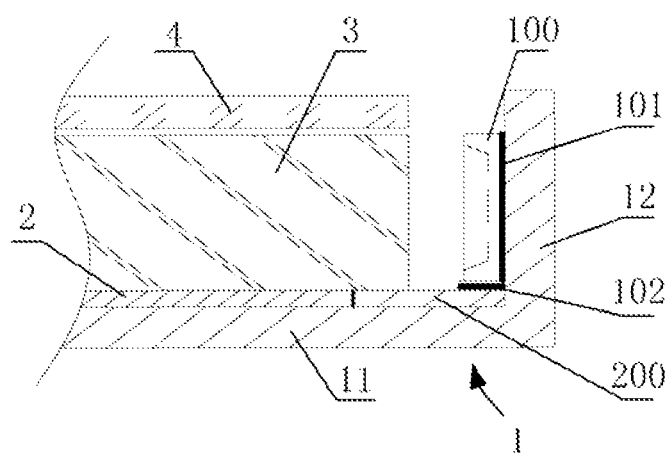
FIG. 7 is a simplified structure diagram of a backlight module of a first example of the present disclosure.

As shown in FIG. 7, the packaging structure of the LEDs 100 of the first example is used in the backlight module of the LCD device. The backlight module comprises a backplane 1, a reflector plate 2 arranged on a bottom plate 11 of the backplane 1, a light guide panel 3 arranged on the reflector plate 2, and a diffuser plate 4 arranged on the light guide panel 3. A PCB 200 of the lightbar 300 is positioned on the bottom plate 11 of the backplane 1, the LEDs 100 are vertically arranged at the edge of the PCB 200, and back surfaces of the LED are arranged close to a side wall 12 of the backplane 1. Thus, for an A value of an LCD module (distance from an light emitting surface of each LED to an edge of an active area of the LCD module), thickness of one PCB can be increased, and optical quality can be improved. In addition, such arrangement enables the LEDs 100 to be directly in contact with the side wall 12 of the backplane 1, thereby favoring heat dissipation.

To enhance efficiency of dissipating heat of the LEDs 100, the back surface of each LED 100 is configured with a heat sink 101, and a bottom of the LED 100 contacting with the PCB 200 is also configured with a heat sink 102. Thus, the efficiency of dissipating heat of the lightbar 300 is further enhanced.

Example 2

Figure 5:
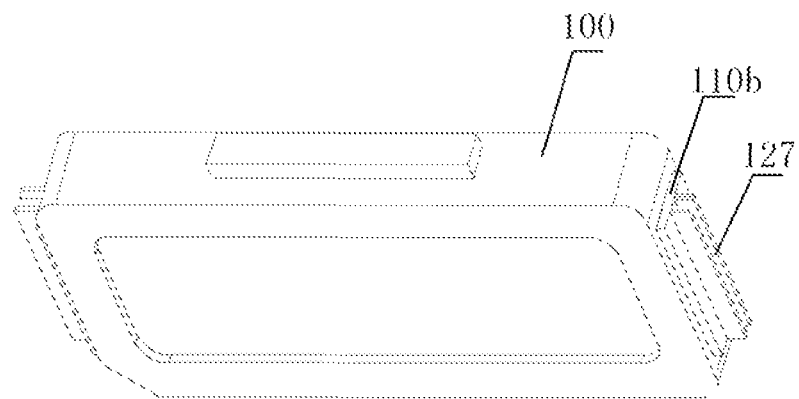
FIG. 5 is a simplified structure diagram of an LED of a second example of the present disclosure.

As shown in FIG. 5 and FIG. 6, the second example is different from the first example in that, the fourth fixing structure 110b of the LED 100 is formed with a clamping slot 127 in the first example, while the third fixing structure 210b arranged on the PCB 200 is formed with a clamping strip 221 in the second example. In the first example (as shown in FIG. 1), strength of the butting structure can be improved by arranging the clamping strips 111 on the LED 100, while the strength of the butting structure is lower than that of the first example if the clamping strip 221 is arranged on the PCB 200 (as shown in FIG. 6) as in the second example.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

I claim:

1. A backlight module, comprising:
a backplane comprising a side wall(s) and a bottom plate;
a printed circuit board (PCB) arranged on the backplane and positioned on the bottom plate; and light emitting diodes (LEDs) vertically arranged at an edge of the PCB, and wherein back surfaces of the LEDs are arranged close to the side wall of the backplane;

wherein the PCB is configured with a fixing support(s), wherein the fixing support is formed with a clamping slot;

wherein two sides of a light emitting surface of the LED are configured with a fixed structure, wherein the fixed structure is formed with a clamping strip, and the clamping strips on two sides of a light emitting surface of the LED are respectively matched with and mechanically fixed to the clamping slots; and wherein an inner wall of the clamping slot is configured with convex structures and a back surface and a bottom surface of the LED are configured with heat sinks, wherein the clamping slot comprises two vertical supports which are oppositely arranged, and a connecting structure that connects two ends of the two vertical supports; and wherein the clamping slot is fixed to the PCB by the connecting structure.

2. A backlight module, comprising:

a printed circuit board (PCB); and light emitting diodes (LEDs) arranged on the PCB;

wherein the PCB comprises a fixing structure(s), the LED(s) comprise a butting structure that is configured to butt with the fixing structure, and the LED is mechanically fixed to the fixing structure of the PCB by the butting structure of the LED, wherein the fixing structure is a fixing support arranged on the PCB; the fixing support is formed with a clamping slot; the butting structures are the fixed structures arranged on two sides of the light emitting surface of the LED; the fixed structure is formed with a clamping strip, and the clamping strips on the two sides of the LED are respectively matched with and mechanically fixed to the clamping slots, wherein the clamping slot comprises two vertical supports which are oppositely arranged, and a connecting structure that connects two ends of the two vertical supports; and wherein the clamping slot is fixed to the PCB by the connecting structure.

3. The backlight module of claim 2, wherein the LEDs are vertically arranged on the PCB.

4. The backlight module of claim 3, wherein the backlight module comprises a backplane that comprises a side wall(s) and a bottom plate; the PCB is positioned on the bottom plate; the LEDs are vertically arranged at the edge of the PCB, and back surfaces of the LEDs are arranged close to the side wall of the backplane.

5. The backlight module of claim 2, wherein an inner wall of the clamping slot is configured with convex structures.

6. The backlight module of claim 2, wherein the back surfaces of the LEDs are configured with heat sinks.

7. The backlight module of claim 6, wherein bottoms of the LEDs are configured with heat sinks.

8. A light emitting diode (LED) packaging structure, comprising:

a fixing structure(s) arranged on a printed circuit board (PCB), and butting structures arranged on the LEDs; wherein the LEDs are mechanically fixed to the fixing structures of the PCB by the butting structures of the LEDs, wherein the fixing structure is a fixing support arranged on the PCB and formed with a clamping slot; the butting structures are the fixed structures arranged on the two sides of the light emitting surface of each LED; each the fixed structure is formed with a clamping strip, and the clamping strips on the two sides of the LED are respectively matched with and mechanically fixed to the clamping slots, wherein the clamping slot comprises two vertical supports which are oppositely arranged, and a connecting structure that connects two ends of the two vertical supports, wherein the clamping slot is fixed to the PCB by the connecting structure.

9. The packaging structure of claim 8, wherein the LEDs are vertically arranged on the PCB.

10. The packaging structure of claim 8, wherein an inner wall of the clamping slot is configured with convex structures.

11. The packaging structure of claim 8, wherein the back surfaces of the LEDs are configured with heat sinks.

12. The packaging structure of claim 11, wherein bottoms of the LEDs are configured with heat sinks.

* * * * *